Patented July 12, 1927.

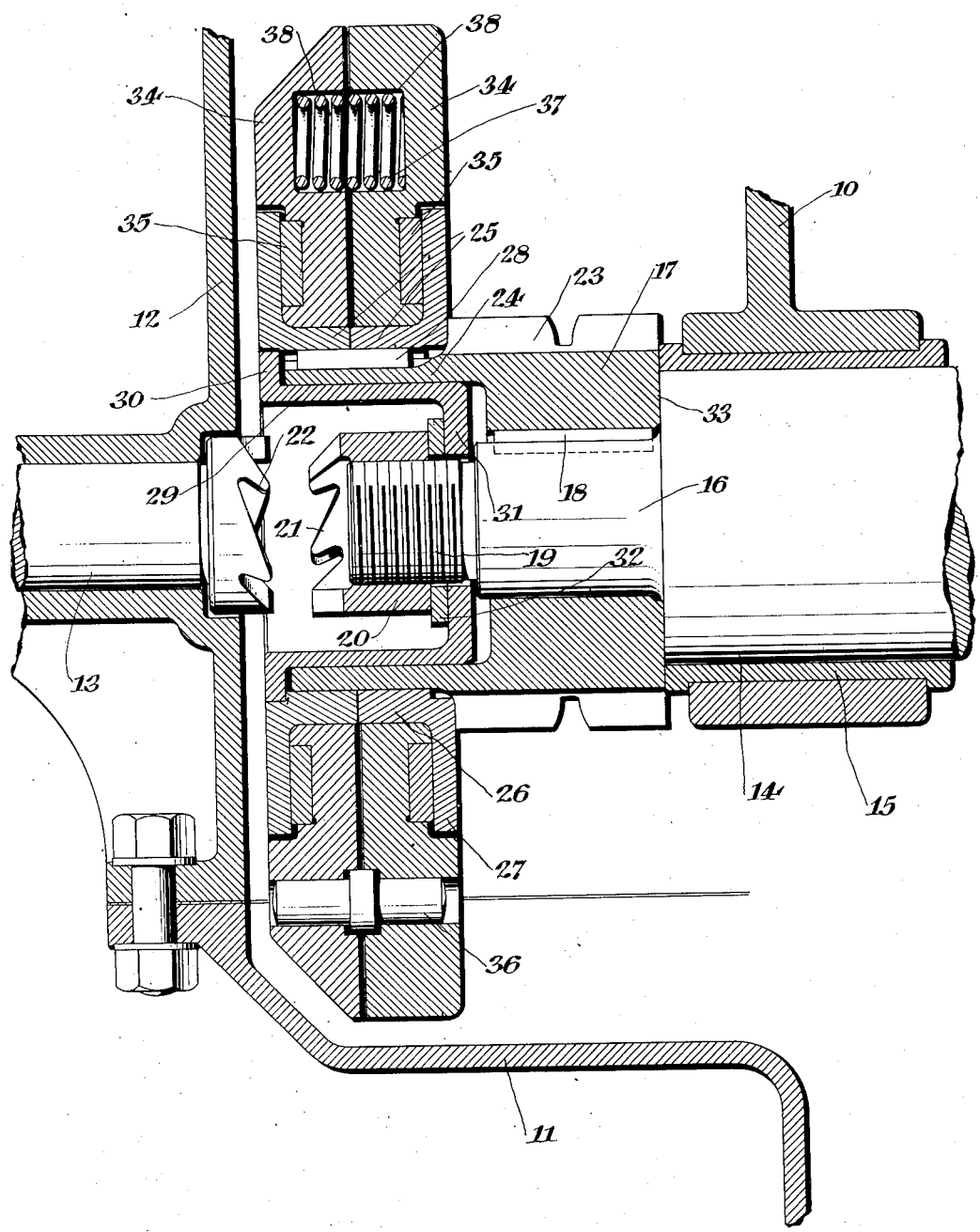

1,635,855

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed November 10, 1923. Serial No. 673,871.

This invention relates to internal combustion engines and particularly to the crankshaft and vibration damper thereon.

One of the objects of the invention is to provide an internal combustion engine with a vibration damper of simple and inexpensive construction.

Another object of the invention is to mount the vibration damper of an internal combustion engine within the crankcase so that it may be lubricated by splash therein.

Another object of the invention is to simplify the connection of the vibration damper parts to the crankshaft of an internal combustion engine.

Other objects of the invention will appear from the following description taken in connection with the drawings, which form a part of this specification, and in which the figure is a vertical longitudinal section through the front end of an internal combustion engine embodying the invention.

The invention relates in particular to the type of vibration damper referred to in patent to Lanchester No. 1,085,443, dated January 27, 1914. These vibration dampers are usually mounted at the extreme end of the crankshaft opposite the fly-wheel end of an internal combustion engine and they are adapted to damp out the torsional vibrations or oscillations of the crankshaft. Dampers of this type comprise in general a small fly-wheel mounted with a friction fit on the crankshaft so that they will slip when the crankshaft is subjected to vibration in the direction of its rotation.

Referring to the drawings, 10 represents the upper part of the crankcase of an internal combustion engine and 11 is the lower section or bottom cover thereof. 12 is the front cover of the crankcase in which is mounted a hand starting crank 13. The crankshaft of the engine is represented at 14 and its forward bearing is shown at 15 in one of the webs of the crankcase 10. The front end of the crankshaft 14 is reduced somewhat as at 16 for the mounting of a transmission member shown in the form of a gear 17 which is keyed to it as at 18. This gear may be either an ordinary spur gear for meshing with another similar gear or it may be a gear of the sprocket type for carrying a chain for transmitting motion to the camshaft and other moving parts of the engine.

The extreme end of the crankshaft is further reduced in diameter as shown at 19 and provided with threads for a member 20 which is shown as formed with clutch teeth 21 to mesh with similar teeth 22 on the end of the starting crank 13. By this means the teeth 21 and 22 may be engaged for rotating the crankshaft by means of the starting crank 13. The member or nut 20 has also another function which will be hereinafter more fully explained.

The transmission member or gear 17, besides being formed with teeth 23, is also formed with an extension 24 which projects beyond the reduced portion 16 of the crankshaft and radially around and spaced from the portion 19 thereof. Upon this extension are arranged a pair of flanged members 25 which are formed with cylindrical parts 26 and opposed flanges 27. These flanged members or rings 25 are keyed to the extension 24 as shown at 28 so that they will turn with the gear and consequently with the crankshaft 14. They are, therefore, in effect mounted upon the crankshaft.

The elements or rings 25 are retained in position on the extension 24 by means of a flanged sleeve 29 which sleeve fits within the extension 24 and has a radial flange 30 at its outer end which bears against the outer ring 25 and an inner flange 31 which extends inwardly around the reduced portion 19 of the crankshaft. A washer 32 is arranged between the nut 20 and the inner flange 31. It will be seen that by tightening the nut 20 the sleeve 29 will be moved inwardly and the rings 25 will be clamped between the flange 30 of the sleeve 29 and the teeth 23 of the gear 17. The gear 17 abuts against a shoulder 33 formed by reducing the crankshaft at 16, and in this way the gear 17 and the rings 25 are together clamped in place on the end of the crankshaft by means of the nut 20.

Mounted between the flanges 27 of the rings 25 and adapted to frictionally engage therewith, is the damper fly-wheel. This fly-wheel is shown as formed in two parts 34, each of which has a friction ring 35 on its outer face and in contact with the adjacent flange 27. These fly-wheel parts are adapted for rotation on the cylindrical parts 26 of the rings 25, being a nice fit thereon. The parts 34 are caused to rotate together by reason of one or more dowels 110

36 shown near the lower part of the figure. The fly-wheel parts 34 are yieldingly urged towards the flanges 27 by spring means within the fly-wheel parts themselves. One of the springs is shown at the upper part of the figure and indicated at 37 and it will be understood that there are a series of these coil springs arranged in recesses 38 as shown in the drawing.

From the above it will be seen that all of the parts mounted on the crankshaft 14 will normally rotate with the crankshaft and it is only when the end of the crankshaft tends to vibrate torsionally that the fly-wheel parts 34 willl tend to move on the rings 25 and by their frictional contact with the rings they will tend to retard or dampen the oscillations of the shaft.

By mounting the vibration damper as shown herein no extra length is required of the crankshaft and very few additional pieces are needed for connecting the damper to the crankshaft.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

In an engine, the combination with the crankshaft thereof, of a member mounted on said crankshaft adjacent the end thereof and having an extension around but spaced radially from the end of said crankshaft, a vibration damper mounted on said extension, a sleeve extending inside of said extension and having a flange to retain said damper on said extension, said sleeve also having a flange at its inner end, and a device on said crankshaft and abutting against said inner flange for retaining said sleeve and damper in position.

In testimony whereof I affix my signature.

ALFRED MOORHOUSE.